United States Patent Office 3,169,907
    Patented Feb. 16, 1965

3,169,907
    METHOD OF RELIEVING MIGRAINE WITH 5-AL-
    LYL-5-(β - HYDROXY - PROPYL) - BARBITURIC
    ACID
    Jean Heusser and Christian Schmid, both of Adliswil,
    Switzerland, assignors to Hommel, S.A., Zurich,
    Switzerland
    No Drawing. Filed Aug. 7, 1961, Ser. No. 129,539
    Claims priority, application Switzerland, Apr. 26, 1961,
    4,921/61
    3 Claims. (Cl. 167—65)

The present invention relates to 5-allyl-5-(β-hydroxypropyl)-barbituric acid, novel methods for the preparation thereof, and novel therapeutic use thereof. More particularly, the invention has especial relation in one aspect thereof to the preparation of 5-allyl-5-(β-hydroxy-propyl)-barbituric acid with a melting point of 164–165° C.

In a first aspect of the invention, 5-allyl-5-(β-hydroxypropyl)-barbituric acid is prepared from diallylbarbituric acid according to the following reaction scheme:

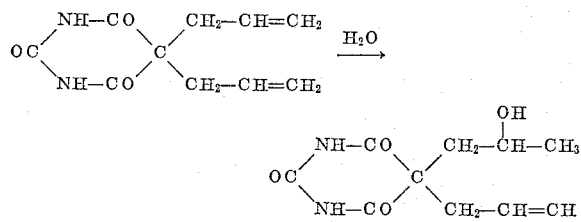

More specifically, the 5 - allyl - 5-(β-hydroxy-propyl)-barbituric acid is prepared by adding on water to one allyl side chain of the starting diallyl-barbituric acid. This addition is effected by reacting the latter with sulfuric acid (saturation of the double bond) and then subjecting the sulfuric acid-addition product to the action of water (hydrolysis). Close adherence to temperature conditions, as set forth in the hereinafter-detailed appurtenant working example (Example 1), is preferred in order to suppress undesired by-products. It is also desirable to remove residual sulfuric acid as far as possible.

A second aspect of the invention involves a modification of the process outlined in the preceding paragraph whereby the process is rendered more practical and capable of being satisfactorily carried out on an industrial scale. Thus a much higher yield of higher quality product is rendered possible by the said modification. Briefly stated, the modification consists in working up the crude reaction product in an appropriate mixture of organic or inorganic solvent with a preferably concentrated, advantageously saturated aqueous solution of a halogen salt or of a suitable salt of a volatile acid, whereby the corresponding sulfate is formed and the resulting hydrohalic acid is dissolved in the organic phase where it exerts an indispensible stabilizing action. The result is that the yield is at least doubled and that the obtained product has a melting point of about 165° C. (164–165° C.). This procedure obviates any necessity for removal of sulfuric acid, e.g. by boiling with alcohol. Since difficulty in effecting total elimination of residual sulfuric acid prejudices the quality of the eventual product, the modified procedure just described removes this prior stumbling block to the realization of the desired high quality product.

The following examples represent presently-preferred illustrative embodiments of the processes according to the invention, Examples 1 and 2 exemplifying more particularly the aforesaid modified procedure. In these examples, the parts are by weight and the temperatures are in degrees centigrade.

Example 1

9 parts of diallyl-barbituric acid are added to a precooled mixture of 15.5 parts of conc. sulfuric acid and 0.5 part of water while stirring intensively, the mixture being cooled so that its temperature does not exceed 25°. The honey-colored viscous solution is stirred vigorously and all at once into 45 parts of water, whereupon the mixture warms up to 35–40° and, after several seconds, solidifies into a thick pulp, which is then heated as quickly as possible to 95°, at which temperature a clear solution is formed. This is cooled slowly until the 5-allyl-5-(β-hydroxy-propyl)-barbituric acid begins to form coarse-grained crystals, after which the mass is cooled rapidly to 20°.

The crystallized 5-allyl-5-(β-hydroxy-propyl)-barbituric acid is centrifuged off, 55–58 parts of mother liquor and 10–13 parts of crude product being obtained. The latter is dispersed in 20 parts of saturated aqueous sodium chloride solution and after two hours is again centrifuged off.

The thus-washed crude product is dissolved in a mixture of 12 parts of ethanol and 20 parts of benzene, with mild warming if necessary. 1 part of sodium chloride and 1.5 parts of saturated aqueous sodium chloride solution are added to the obtained solution in ethanol-benzene, and whole thoroughly admixed. When the brine layer has settled, it is separated and the afore-described washing repeated. The clear solution is concentrated under reduced pressure until incipient formation of crystals and is then poured into 30 parts of benzene, whereupon a thick crystalline pulp is forthwith formed which, after being cooled to room temperature, is centrifuged off. The so-obtained 5-allyl-5-(β-hydroxy-propyl)-barbituric acid is dried at 70° under reduced pressure and can be used for therapeutic purposes without further purification. M.P. 164–165°. Yield: 5 parts.

The thus-obtained product is especially valuable for the relief of migraine or cephalea vasomotorica, and because of its superior quality better and more accurate dosability. Administration: per os or parenterally.

Example 2

The crude product, obtained as in Example 1 and washed with sodium chloride solution, is dissolved in 12 parts of ethanol and 20 parts of benzene, after which there is added an excess of calcium chloride in solution in 80% ethyl alcohol. The required quantity of calcium chloride is determined analytically. (For example, for a solution of 10 parts of crude product with a 2% content of sulfuric acid, there is added 0.25 part of calcium chloride in 1.5 parts of 80% ethyl alcohol.) After several minutes of intensive admixing, 5 parts of anhydrous sodium sulfate are slowly added to the solution. After solid matter has settled, the clear solution is decanted as far as possible and the settled bottoms centrifuged. The centrifuge residue is dispersed in 10 parts of ethanol and again centrifuged. The combined clear solutions are concentrated under reduced pressure until crystal formation begins and are then poured into 30 parts of benzene, whereupon a thick crystalline pulp forms at once; after cooling to room temperature, this pulp is centrifuged. The so-obtained 5-allyl-5-(β-hydroxy-propyl)-barbituric acid is dried at 70° under reduced pressure and can be used therapeutically with no further purification. Yield: 5.8 parts. M.P. 164–165°. Mode and purpose of use: as in Example 1.

In lieu of benzene, another organic solvent such e.g. as toluene or ethanol or the like may be employed.

The following example is illustrative of compositional forms of preparations which may be employed in therapeutically administering the products obtained according to Examples 1 and 2:

*Example 3*

(1) A tablet useful for example in the relief of migraine may be made up as follows:

Sugar is admixed with 5-allyl-5-(β-hydroxy-propyl)-barbituric acid (M.P. 164–165° C.) and water in such relative proportion that each eventual tablet made in per se conventional manner by molding from the resultant mass will contain about 0.1 gram of the said compound. The number of tablets administered per day during an attack of migraine will be determined by the attending physician. The dosage unit may be varied and may e.g. be as high as 0.4 gram per tablet. The latter may be candy-coated if desired, and may include conventional extenders such as powdered starch or the like.

(2) A parenterally administerable solution (injection) may be made up from e.g. Water for Injection U.S.P. and glyceride in conventional proportions, the solution being as usual packaged in a container which will maintain the contents sterile until used. Each thus-packaged dose may contain e.g. up to 0.4 gram of 5-allyl-5-(β-hydroxy-propyl)-barbituric acid (M.P. 164–165° C.). The stability of this solution is enhanced by maintaining its pH between 2.0 and 7.0.

Having thus disclosed the invention, what is claimed is:

1. A method of relieving migraine which comprises administering an effective but non-toxic amount of 5-allyl-5-(β-hydroxy-propyl)-barbituric acid of M.P. 164–165° C.

2. A method of preparing 5-allyl-5-(β-hydroxy-propyl)-barbituric acid which comprises reacting diallyl-barbituric acid with sulfuric acid until the double bond in one allylic side chain is saturated, subjecting the resultant reaction product to hydrolysis with water, dissolving the hydrolyzed product in an organic solvent therefor, adding to the resultant solution a substantially saturated aqueous halide solution, whereby any sulfuric acid present is converted into sulfate form and the hereby liberated hydrohalic acid is dissolved in the organic phase, recovering the thus-produced 5-allyl-5-(β-hydroxy-propyl)-barbituric acid of M.P. 164–165° C. by precipitation from the reaction mixture in the presence of the hydrohalic acid, and then drying whereby the said acid is eliminated and the essentially pure product is obtained.

3. A method of preparing 5-allyl-5-(β-hydroxy-propyl)-barbituric acid which comprises reacting diallyl-barbituric acid with sulfuric acid until the double bond in one allylic side chain is saturated, subjecting the resultant reaction product to hydrolysis with water, dissolving the hydrolyzed product in an organic solvent therefor, adding to the resultant solution a substantially saturated aqueous chloride solution, whereby any sulfuric acid present is converted into sulfate form and the hereby liberated hydrochloric acid is dissolved, recovering the thus produced 5-allyl-5-(β-hydroxy-propyl)-barbituric acid of M.P. 164–165° C. by precipitation from the reaction mixture in the presence of the hydrochloric acid, and then drying whereby the said acid is eliminated and the essentially pure product is obtained.

References Cited by the Examiner
UNITED STATES PATENTS 3,123,613    3/64    Bloch _____ 260—296

OTHER REFERENCES

Bobranski: Chem. Abst., 1957, vol. 51 page 438(f).
Conn: Current Therapy, 1959, W. B. Saunders Co., pp. 514–515.
Drill: Pharmacol. in Medicine, sec. ed., 1958, McGraw-Hill, page 176–177.
Fieser: Organic Chemistry, D. C. Heath Co., sec. ed., 1950, p. 65.
Karrer: Organic Chemistry, 1946, page 94–103.
Loubriel: J. Am. Chem. Soc., vol. 56, pp. 1968–1969, 1934.
Maynert: J. Am. Chem. Soc., vol. 75, pp. 700–704, 1953.
Maynert: J. Biol. Chem., vol. 195, pp. 397, 403 and 406, 1952.
Physician Desk Reference 1960 Medical Economics Inc. p. 469.
Wilimowski et al., Chem. Abst. vol. 53, pages 14351(e), 22475(e–f), 1959, citing Arch. Immunol. Therap. Doswiadizolneji vol. 6, pages 749–59, 1958 and vol. 7, pages 94–104 and pages 105–12, 1959.

JULIAN S. LEVITT, *Primary Examiner.*

M. O. WOLK, IRVING MARCUS, LEWIS GOTTS,
*Examiners.*